Patented Aug. 14, 1951

2,564,649

UNITED STATES PATENT OFFICE 2,564,649

PREPARATION OF LYSINE

Arthur O. Rogers, Lewiston, N. Y., assignor to E. I. du Pont de Nemours & Company, Wilmington, Del., a corporation of Delaware No Drawing. Application January 13, 1949, Serial No. 70,799

26 Claims. (Cl. 260—534)

This invention relates to the production of lysine and more particularly it relates to a novel process for the production of lysine.

This application is a continuation-in-part of co-pending application Serial No. 758,985, filed July 3, 1947, now abandoned.

Lysine is potentially of major commercial importance for use as an additive for various animal and human foods. The compound or its hydrohalides have been prepared heretofore from casein, gelatine and the like proteins. So far as I am aware neither lysine nor its hydrohalides have been prepared synthetically for commercial use.

It is one of the objects of this invention to provide a new and practical process which is suitable for use on a commercial scale for the production of lysine. Another object is to provide a process for the production of lysine from delta-hydroxyvaleraldehyde or dihydropyran and other readily available materials.

The above objects are attained in accordance with my invention by reacting in an aqueous system at elevated temperatures delta-hydroxyvaleraldehyde, a compound yielding carbonate ions, a compound yielding ammonium ions and a compound yielding cyanide ions to produce 5-(delta-hydroxybutyl) hydantoin; reacting said hydantoin with hydrogen chloride or hydrogen bromide to form 5-(delta-chlorobutyl) hydantoin or 5-(delta-bromobutyl) hydantoin; reacting 5-(delta-chlorobutyl) hydantoin, or the corresponding bromo compound, with ammonia and hydrolyzing the resulting 5-(delta-aminobutyl) hydantoin to obtain lysine which may be conveniently isolated or recovered in the form of its mono- or dihydrohalide.

The following illustrate the reactions occurring in the process of my invention:

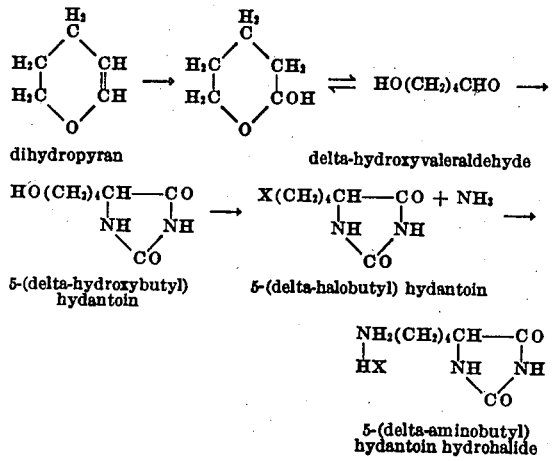

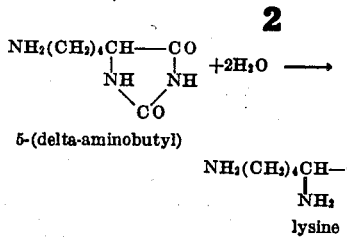

The X in the above formulas represents chlorine or bromine.

In carrying out the first step of my novel process it is preferred to react a compound yielding carbonate ions, a compound yielding ammonium ions and a compound yielding cyanide ions directly with the products obtained by the hydration of dihydropyran in a dilute aqueous acid medium.

In general, I may proceed by hydrating dihydropyran in a dilute mineral acid. For example, there may be utilized 0.02 N hydrochloric acid to which dihydropyran is added with agitation and heating. I have found that about 200 cc. of 0.02 N hydrochloric acid is suitable for each mole of dihydropyran. Although the concentration of the mineral acid is in general not critical, at least one mole of water should be present for each mole of dihydropyran utilized. I prefer to utilize an excess of water, for example, about 10 moles of water for each mole of dihydropyran. The reaction is exothermic and the temperature may rise to about 80° C. At a temperature of 60–80° C., the reaction is rapid and is usually complete in about 15 minutes. The time required for complete reaction may be decreased by utilizing pressures greater than atmospheric and when operating under increased pressure, temperatures up to 150° C. are satisfactory. When the reaction mixture becomes clear, the reaction is complete and the mixture of reaction products may then be neutralized with a base, for example, with sodium bicarbonate to minimize polymerization of hydroxyvaleraldehyde present.

The mixture thus obtained by the acid hydration of dihydropyran is suitable for use directly in the preparation of 5-(delta-hydroxybutyl) hydantoin. However, if desired, delta-hydroxyvaleraldehyde may be isolated from the mixture by distillation and the purified material used in the preparation of the hydantoin. I prefer to utilize the crude mixture obtained by the hydration of dihydropyran as described above.

Thus, for example, there may be added to the crude mixture of hydration products ammonia and carbon dioxide or other compounds yielding ammonium ions and carbonate ions, for example, ammonium carbonate, and a compound yielding cyanide ions, for example, hydrogen cyanide or sodium cyanide. The reaction mixture may then be heated at temperatures of about 60 to 120° C. during several hours. The product, 5-(delta-hydroxybutyl) hydantoin, is then obtained by crystallization from the reaction mixture. Additional amounts of the product are obtained by partial vaporization followed by further crystallization.

I have further discovered that the yield of 5-(delta-hydroxybutyl) hydantoin may in most instances be substantially increased by treatment with acid following completion of the reaction. It is believed that the increase in yield is due to conversion of an intermediate formed during the reaction to the desired product. Accordingly, in a preferred method of operating my invention, when the reaction to form the 5-(delta-hydroxybutyl) hydantoin is complete the reaction mixture is acidified with a strong mineral acid, preferably hydrochloric acid, and heated. The degree of heating is not critical but is preferably maintained at about 80° to 100° C. At lower temperatures the conversion is slow and no advantage is apparent in utilizing higher temperatures. About 1 to 3 hours is usually sufficient although longer or shorter periods of heating may be required depending upon the temperature. Strong acids other than hydrochloric may be used, for example, sulfuric acid. I prefer to use hydrochloric acid since this acid is economical, effective and without adverse effect upon the product.

If desired, the product may first be recovered from the reaction mixture and the mother liquor subsequently treated with acid as described above.

The step in my novel process wherein delta-hydroxyvaleraldehyde or a crude mixture obtained by the hydration of dihydropyran which contains delta-hydroxyvaleraldehyde is reacted with a compound yielding carbonate ions, a compound yielding ammonium ions and a compound yielding cyanide ions is preferably carried out in a basic medium. If, for example, ammonium chloride, hydrogen cyanide and carbon dioxide are utilized it is preferred to add a base, for example, sodium hydroxide or sodium carbonate. However, it is not essential that basic conditions be utilized and neutral or slightly acid conditions may be utilized if desired although I have found that optimum results are obtained by utilizing a basic reaction medium.

I prefer to carry out reaction at elevated temperatures. For example, temperatures within the range of about 40–150° C. In general, the best results are usually obtained when temperatures within the range of 60–120° C. are utilized. At temperatures lower than 40°, the reaction is very slow. At temperatures higher than 150° C., no advantage is found.

By compounds yielding cyanide ions, carbonate ions or ammonium ions is meant any compound which produces substantial amounts of the ions in solution. Thus, sodium cyanide and ammonium cyanide are examples of suitable compounds since these give substantial amounts of cyanide ions in solution whereas compounds such as ferrocyanides and copper cyanide do not yield substantial amounts of cyanide ions and are therefore unsuitable for the practice of my invention. Thus, instead of using sodium cyanide, potassium cyanide or hydrogen cyanide as the compound yielding cyanide ions other inorganic cyanides may be utilized. For example, alkaline earth metal cyanides such as barium cyanide or other cyanides which will yield cyanide ions in aqueous solution are suitable. Sodium cyanide or hydrogen cyanide are the preferred cyanide compounds since these materials are readily available at low cost and give high yields of desired product.

Likewise, in place of ammonium carbonate or ammonia and carbon dioxide, other compounds or combination of compounds which will yield carbonate ions and ammonium ions may be used. For example, ammonium chloride and carbon dioxide or ammonium carbamate may be utilized.

Although it is essential to satisfactory production of 5-(delta-hydroxybutyl) hydantoin that the step be carried out in an aqueous system it is not objectionable and in some instances may be desirable to have present solvents other than water. Thus, there may be utilized monohydric alcohols, for example, ethanol or butanol or polyhydric alcohols, for example ethylene glycol. Other non-aqueous solvents may be used if desired. Usually it will not be desirable to use more than about 10% by weight of solvents other than water in the system although amounts up to 50% by weight may be present if desired.

As a convenient method to determine when the reaction to form 5-(delta-hydroxybutyl) hydantoin is complete a portion of the reaction mixture is titrated for ammonium hydroxide until successive titrations give constant results. The time required varies with reaction conditions. An alternative method for determining the end point of the reaction is to cool samples of the reaction mixture until successive samples show no increase in the amount of product precipitated.

The product, 5-(delta-hydroxybutyl) hydantoin, was found to contain the calculated percentage of nitrogen. By treatment with hydrochloric acid, it was converted to 5-(delta-chlorobutyl) hydantoin, analysis of which showed the calculated percentage of chlorine. The chlorobutyl hydantoin, on treatment with ammonia, yielded 5-(delta-aminobutyl) hydantoin. The latter was isolated as the hydrochloride, which contained the calculated quantity of ionizable chlorine. Hydrolysis of the aminobutyl hydantoin yielded lysine, which has been isolated as the dihydrochloride, and as the monohydrochloride. Each of these compounds had the correct melting point and ionizable chlorine content. Feeding tests showed these products to have the predicted biological activity when added to a lysine-deficient diet.

As further confirmation of its identity, 5-(delta-hydroxybutyl) hydantoin, was hydrolyzed with hydrochloric acid. The product, alpha-amino-epsilon-chlorocaproic acid was identical with that obtained by similar treatment of 5-(delta-chlorobutyl) hydantoin, and was identified by analysis for nitrogen content. When treated with ammonia, the amino-chlorocaproic acid yielded pipecolinic (piperidine-alpha-carboxylic) acid.

The 5-(delta-hydroxybutyl) hydantoin obtained as described above is then reacted with hydrogen chloride or hydrogen bromide, preferably at elevated temperatures, to obtain 5-(delta-chlorobutyl) hydantoin or 5-(delta-bromobutyl) hydantoin. Thus, in the second step of my invention I may proceed by passing hydrogen chloride into contact with 5-(delta-hydroxybutyl) hydantoin heated to a temperature sufficiently high to provide a liquid reaction medium. Small amounts of water or other suitable material may be added to the hydroxy hydantoin to lower the melting point. The reaction mixture is preferably well agitated and is heated in contact with hydrogen chloride until the melting point of a sample of the product reaches the correct value or does not rise with continued treatment. The reaction usually requires about 1 to 10 hours depending upon the reaction conditions.

In one embodiment hydrogen chloride is passed into contact with 5-(delta-hydroxybutyl) hydantoin in the presence of water. The amount of water utilized should not be more than about 50% by weight of the reaction mixture since in the presence of greater amounts of water undesirable hydrolysis of the product may occur. In general I utilize sufficient water to lower the melting point of the reaction mixture to the desired temperature of operation or slightly lower. Usually about 10 to 20% water is sufficient.

In a preferred method of carrying out the reaction I utilize a reaction medium comprising a mixture of 5-(delta-hydroxybutyl) hydantoin and 5-(delta-chlorobutyl) hydantoin as I have found that the best yields are obtained in this manner and isolation of the product is simplified. The concentration of chlorobutyl hydantoin present is not critical and will vary as the reaction proceeds. Preferably sufficient 5-(delta-chlorobutyl) hydantoin is utilized so that the reaction mixture is liquid at the preferred operating temperatures. I have found it satisfactory to use equal weights of chlorobutyl hydantoin and hydroxybutyl hydantoin.

I prefer to operate this step of my invention at elevated temperatures and temperatures of 75° to 200° C. are suitable. Preferably, I utilize temperatures within the range 115° to 135° C. for best results. At temperatures below 75° C. the reaction is slow while at temperatures above 200° C. decomposition may occur with resultant contamination of the product.

The reaction may be operated at atmospheric pressures with excellent results. However, if it is desired further to accelerate the reaction pressures greater than atmospheric may be utilized. Pressures of less than atmospheric may also be utilized if desired.

Although it is preferred to utilize gaseous hydrogen chloride or hydrogen bromide, these gases may be replaced in part by aqueous solutions as long as the total amount of water present in the reaction mixture does not exceed 50% by weight.

If desired, catalysts may be used. Examples of suitable catalysts are catalysts of the amine salt type and quaternary ammonium compounds as illustrated by pyridine, quinoline, tetramethyl ammonium chloride and trimethyl benzyl ammonium chloride.

The amine salts which are suitable are those compounds having the following general formula:

wherein each R substituent is hydrogen or an alkyl or aralkyl radical, Y is an alkyl radical and X is either chlorine or bromine. The preferred catalysts of this type are those amine salts which are aliphatic compounds in which at least two of the R substituents in the above general formula are alkyl radicals. That is, the preferred catalysts of this class are the aliphatic tertiary amine hydrochlorides and amine hydrobromides and the tetraalkyl quaternary ammonium chlorides and bromides.

The use of catalysts permits effective operation at lower temperatures. I have found, for example, that the best results are obtained using a pyridine hydrohalide as catalyst at temperatures of about 90° to 100° C. instead of the preferred temperatures of 115° to 135° C. when operating the non-catalytic process. The reaction is also more rapid when a catalyst is used. In general, I prefer to utilize an amount of catalyst which is about equal to the weight of the 5-(delta-hydroxybutyl) hydantoin. Smaller quantities may be used but for effective results at least 10% by weight based on the amount of 5-(delta-hydroxybutyl) hydantoin should be present. Amounts of catalysts greater than an equal weight may be utilized but without any apparent advantage. When utilizing catalysts of the types described above, it is desirable to have present sufficient water to maintain the hydrochlorides in solution. A slight excess of water may be present but it is necessary for best results to avoid a concentration of water greater than 50% by weight of the reaction medium.

Although I have found that the utilization of catalysts in the operation of the second step of my invention is effective in increasing the reaction rate and lowering the temperature required, I prefer to utilize a non-catalytic process utilizing a mixture of 5-(delta-hydroxybutyl) hydantoin and 5-(delta-chlorobutyl) hydantoin as the reaction medium since excellent results are thus obtained and the problem of separating and recovering a catalyst is avoided.

It is to be understood that although in the foregoing description I have referred to the preparation of 5-(delta-chlorobutyl) hydantoin, 5-(delta-bromobutyl) hydantoin is also included within the scope of this invention. The 5-(delta-bromobutyl) hydantoin is prepared in the same manner as the 5-(delta-chlorobutyl) hydantoin by utilizing hydrogen bromide in the place of hydrogen chloride as described above.

Although hydrogen chloride or hydrogen bromide are preferred reactants in forming the halobutyl hydantoin obvious equivalents thereof, for example, thionyl chloride or bromide and phosphorus chlorides or bromides may be utilized if desired. Analyses of the products showed the chlorine and bromine contents to be in close agreement with the theoretical values. A recrystallized sample of 5-(delta-chlorobutyl) hydantoin was found to contain 18.47% chlorine. The calculated value for the compound is 18.60% chlorine. A sample of the 5-(delta-bromobutyl) hydantoin analyzed 33.8% bromine whereas the calculated value is 34.1%.

Both the bromo and the chloro compounds are soluble in hot water, methanol or ethanol and are sparingly soluble in these solvents cold. They are insoluble in most organic solvents, for example, ethers, hydrocarbons and halogenated hydrocarbons. The compounds dissolve in aqueous alkalies and may be reprecipitated by acidification.

The 5-(delta-halobutyl) hydantoin obtained as described above may then be converted to lysine by reaction with ammonia followed by hydrolysis of the resulting 5-(delta-aminobutyl) hydantoin as described below. The intermediate aminobutyl hydantoin may be isolated and purified prior to its use in the final hydrolysis step, but such isolation is not necessary and preferably no such isolation is carried out. I have discovered that either of the above halobutyl hydantoins may be converted to lysine in high yields and that the method constitutes a convenient and highly practical means for obtaining lysine.

The ammonia employed may be either aqueous or anhydrous. If desired an inert diluent, e. g. an alcohol, an ether, a hydrocarbon or the like, may be present in the reaction mixture although such a diluent is not necessary. The use of aqueous ammonia is generally more convenient, gives somewhat higher yields and is preferred. In either case, a large excess, e. g. 10-100 moles of total inorganic ammonia per mole of halobutyl hydantoin, is desirable in order to suppress formation of by-product secondary and tertiary amino and quaternary ammonium compounds. It is preferred to employ from 40-80 moles of ammonia per mole of halobutyl hydantoin under which conditions good yields of the desired primary amino product, i. e. 5-(delta-aminobutyl) hydantoin, are obtained. Still larger excesses of ammonia, e. g. more than 100 moles per mole of the hyantoin, may be used with good results, but are not recommended for economic reasons due to the added cost of recovering such large excesses. Incidentally, the chlorobutyl and bromobutyl hydantoins, although sparingly soluble in water are readily soluble in either aqueous or anhydrous ammonia.

Such factors as temperature, time, concentration and pressure are mutually interdependent with respect to the ammonolysis reaction. The preferred temperature range is about 30-70° C. although temperatures above and below that range may be employed. The reaction proceeds at temperatures as low as 0° C. although at an impractically slow rate. Temperatures as high as 150° C. may be employed if desired although the higher temperatures tend to increase formation of secondary and tertiary amino and quaternary ammonium compounds. The end point of the reaction may be determined by titrating aliquots of the reaction mixture until the chloride ion content becomes constant or reaches its theoretical value. At the preferred temperature this requires about 6 to 8 hours. The concentrations of the reactants in the reaction mixture, particularly in aqueous systems, does not appear to be critical. For practical reasons the concentrations of the halobutyl hydantoin should be as high as possible while still maintaining the material in solution. The reaction in aqueous systems may be carried out at atmospheric pressure provided sufficient water is present to prevent undue loss of ammonia or carbon dioxide. At the higher concentrations of reactants, which are generally preferred, a pressure of about 15 pounds gage is developed in the aqueous system. In the anhydrous system the pressure will be substantially the vapor pressure of amonnia at the chosen temperature.

The ammonolysis reaction may be carried out in vessels constructed of any material which is not attacked by ammonia. Ordinary or stainless steel vessels are suitable, but copper and silver vessels are obviously unsuitable.

The presence of ammonium salts, e. g. the nitrate, chloride, sulphate, and the like, and particularly ammonium carbonate, bicarbonate or carbamate, or mixtures of such ammonium salts, in the ammonolysis reaction mixture is decidedly beneficial in that such salts enhance the formation of the desired primary amino compound and inhibit the formation of by-product secondary and tertiary amino and quaternary ammonium compounds. Inhibition of the formation of such latter compounds is advantageous in that their formation results in a corresponding decrease in the yields of the desired primary compound. Furthermore, the hydrolysis products resulting from such by-product compounds seriously interfere with the final crystallization of lysine hydrochlorides and it is accordingly preferred to carry out the ammonolysis reaction in the presence of a substantial amount of an ammonium salt. Amounts of such salts containing in combined form from 20-80% of the total inorganic ammonia present in the system, are recommended. The term "inorganic ammonia" is used to mean all ammonia present either as free ammonia or as combined ammonia, exclusive only of ammonia combined in the hydantoin nucleus. In the most preferred modification there will be present in the reaction medium ammonium salts in the amounts indicated and also constituents equivalent stoichiometrically to form 10-55 and preferably 15-25 moles of carbon dioxide per mole of the halobutyl hydantoin. Carbon dioxide itself may be added for this purpose or salts such as ammonium carbonate, ammonium bicarbonate or ammonium carbamate may be utilized. When using these salts to supply the carbon dioxide requirement, it should be kept in mind that they also supply part of the total inorganic ammonia.

The intermediate 5-(delta-aminobutyl) hydantoin may be hydrolyzed to the lysine stage employing either water alone or aqueous ammonia. However, the rate of hydrolysis with water alone or with aqueous ammonia is slow. Hydrolysis is much more rapid in either an acidic or alkaline aqueous medium and is quite rapid when such a medium contains either a strong mineral acid or a strong inorganic base. Illustrative of the strong acids which may be used are hydrochloric acid, hydrobromic acid and sulphuric acid. As strong inorganic bases, the alkali and alkaline earth metal hydroxides are particularly suitable and of these the alkali metal hydroxides are preferred chiefly because of their greater reactivity and greater solubility in water.

The intermediate aminobutyl hydantoin can be isolated if desired prior to hydrolysis by evaporating the mixture resulting from the ammonolysis reaction and can be further purified by dissolving the hydrohalide of the aminobutyl hydantoin in alcohol and adding an acid such as hydrogen chloride or a liquid non-solvent such as ether or acetone to the alcoholic solution to precipitate the hydrohalide of the aminobutyl hydantoin. Such isolation and purification are, however, not necessary. Usually the excess ammonia and carbon dioxide are distilled off and the residue which is generally an aqueous solution is used directly in the hydrolysis step.

The minimum quantities of acid or base which should be used in the hydrolysis reaction can be determined from the stoichiometric equivalents for the reaction. Thus, when using hydrochloric acid and when starting with the hydrochloride of the intermediate aminobutyl hydantoin, two moles of hydrogen chloride will be required to effect the hydrolysis and neutralize the two amino groups in the lysine product, i. e. convert the product to lysine dihydrochloride. When using the hydrochloride of the aminobutyl hydantoin and hydrolyzing with sulphuric acid, three moles of sulphuric acid ($H_2SO_4$) will be required to effect the hydrolysis and convert the product to the disulphate salt of lysine. In the hydrolysis with either of the above acids there will, of course, be required along with the number of molecules of acid indicated, two moles of water for each mole of the aminobutyl hydantoin hydrochloride. When an alkaline hydrolysis is effected, 4 moles of sodium hydroxide will be required to hydrolyze 1 mole of the aminobutyl hydantoin hydrochloride, whereas half that number of moles of calcium hydroxide is required. In either case the hydrolysis product is obtained in the form of the metal salt of lysine.

When effecting the hydrolysis by means of an acid or a base, an excess of the acid or base, e. g. 10–100% more than the quantities theoretically required as indicated above and a large excess of water are employed in order to insure that effective concentrations of the hydrolyzing agents will be present throughout the reaction. The preferred hydrolyzing agents are hydrochloric acid and the alkali metal hydroxides, e. g. sodium hydroxide. Sulphuric acid and calcium hydroxide may have some advantages, but their use complicates the recovery of lysine from the hydrolysis mixture. Other reagents such as hydrobromic acid, potassium hydroxide and the like may be used effectively but are more expensive equivalents to those preferred agents named above.

The conditions under which the hydrolysis reaction is carried out may be varied considerably depending upon the reagents employed. With acids the apparatus must be constructed or lined with acid-resistant material, e. g. glass, tantalum, silver or the like, and must be capable of withstanding considerable pressure or adapted to permit vending by-product carbon dioxide. When bases are used, metals such as steel are satisfactory and the pressure developed in such a system is about equal to the vapor pressure of water at the temperature of operation. Materials which are attacked by ammonia should of course not be used for the basic hydrolysis.

When using hydrochloric acid as the hydrolyzing agent, it is preferred to employ an amount equal to a 50–100% excess of an initially concentrated solution, e. g. 15–40% aqueous acid, and to carry out the reaction at a temperature of 120–200° C. Acid hydrolysis, however, may be carried out at any temperature within the range of about 80–300° C. Under the preferred temperature conditions the minimum reaction period required to effect complete hydrolysis is on the order of about 1–10 hours. Longer periods of heating are not particularly harmful. The temperature, proportions and concentrations of reactants may be varied considerably with corresponding variations in reaction times. The end of the reaction may be most accurately determined by experience developed by working up the products obtained after various reaction times to determine the yields of lysine. A rough estimate of the completeness of the reaction may be indicated by determining the amount of carbon dioxide evolved. Excess hydrochloric acid may be recovered from the reaction mixture by distillation, leaving a mixture of ammonium chloride and crude lysine dihydrochloride as residue. The lysine may be isolated in pure form by several known methods, e. g. as the dihydrochloride by extracting the above residue with methanol or ethanol and adding a liquid nonsolvent such as acetone or ether to precipitate the dihydrochloride. Alternatively, the alcoholic solution of crude dihydrochloride may be treated with a base, e. g. pyridine, to precipitate the monohydrochloride of lysine.

With an alkali metal hydroxide as the hydrolyzing agent, it is preferred to employ about a 15–25% excess of the base in the form of an initially concentrated solution, e. g. one of about 20% concentration. The preferred temperature is 110–150° C., although temperatures over the wider range of 80–300° C. may be utilized. After completion of the reaction ammonia may be distilled out from the reaction mixture and the solution acidified with hydrochloric acid and evaporated to dryness. The residual mixture of alkali metal chloride and lysine dihydrochloride may then be worked up in the same general manner described above.

Any of the well known bases may be utilized for converting the lysine dihydrohalide product to the monohydrohalide by observing proper precautions. In general, the amount employed should be such as will give a pH in the range of 4–7. Preferably, a base will be chosen whose by-product halide is soluble in the reaction solvent, e. g. alcohol, so as to avoid contamination of the product. The amines and quaternary ammonium bases as well as the alkaline earth hydroxides, but not the alkali metal hydroxides, fall in this class. Pyridine, isopropylamine, calcium hydroxide and calcium carbonate are particularly useful bases for this purpose.

For some purposes it may not be necessary to isolate the lysine in the form of its mono- or dihydrohalide, in which case the final purification step may be omitted and the crude product used directly. It is also possible if desired to resolve the racemic by known methods and obtain the biologically active L(+)-lysine in any desired degree of purity. In this case the biologically inactive D(−)-isomer may be racemized and converted entirely to the active form.

The invention is further illustrated by the following examples:

*Example 1*

One mole (102 g.) of distilled delta-hydroxyvaleraldehyde was mixed with 1 mole (27 g.) of liquid hydrogen cyanide. Four moles (270 cc.) of concentrated ammonium hydroxide were saturated with carbon dioxide while heating to 56° C. The aldehyde-hydrogen cyanide mixture was run in gradually (1 hour), and the mixture heated under a carbon dioxide atmosphere with stirring for 5 hours. The solution was evaporated to about 100 cc., cooled to crystallize the product and filtered. The product was recrystallized twice from 95% ethanol, decolorizing with charcoal. The purified product (19.5 g.) melted at 151–2° C. Analysis by the Kjeldahl method showed 16.0% N (calculated 16.3%).

5-(delta-hydroxybutyl) hydantoin (0.125 mole, 23.8 g.) was placed in a test tube and heated in an oil bath until melted. Hydrogen chloride gas was fed in for 5 hours, holding the temperature at approximately 160–175° C. The product was poured into 100 cc. of water, dissolved by heating and cooled to crystallize. After drying, the resulting crystals of 5-(delta-chlorobutyl) hydantoin weighed 19.7 g. (82.5% of theoretical yield) and melted at 122–123° C.

5-(delta-chlorobutyl) hydantoin (85 g.; 0.446 mole) was dissolved in 735 g. (43.2 moles) of liquid ammonia and the solution heated in a steel autoclave at 90° C. for four hours. The ammonia was evaporated and the residue dissolved in water and filtered. Titration of the water solution for chloride ion showed the ammonolysis to be 93.5% complete. The solution was evaporated to a thick syrup, which was extracted with 500 cc. of boiling absolute alcohol. The alcohol solution was filtered, saturated with hydrogen chloride and allowed to cool slowly, yielding a crystalline precipitate of 5-(delta-aminobutyl) hydantoin hydrochloride; additional quantities were recovered by evaporating the mother liquor. The product weighed 81 g. (87.5% of theoretical) and contained approximately the calculated percentage of ionizable chlorine. The 5-(delta-aminobutyl) hydantoin hydrochloride (36.4 g.; 0.175 mole) was divided among three glass pressure tubes, each containing 50 cc. conc. hydrochloric acid, and heated 17 hours at 150° C. The contents of the tubes were evaporated to dryness, and the residue extracted with 180 cc. 95% ethyl alcohol. The alcoholic solution was filtered to remove ammonium chloride. On adding 215 cc. of ether, lysine dihydrochloride precipitated as a viscous liquid, which crystallized on standing with occasional stirring. The product, when filtered off and dried, weighed 31.3 g. (82.4% of theoretical yield) and contained 32.3% ionizable chlorine (calc. for lysine dihydrochloride, 32.4%). The identity of the product was confirmed by mixed melting point with an authentic sample of lysine dihydrochloride.

*Example 2*

Dihydropyran (4.56 moles, 383.5 g.) was stirred with 1 liter of water and 20 cc. 1 N hydrochloric acid in a water bath at 40° C. until a clear solution was obtained. The mixture was cooled and the flask swept with carbon dioxide. Hydrogen cyanide (4.15 moles, 167 cc.) was added and 28% aqueous ammonia (4.56 moles, 304 cc.) added dropwise over a 2 hour period while stirring vigorously under a carbon dioxide atmosphere. The temperature rose to 48° maximum during the addition of the ammonia and was afterward held at 50–60° for about 12 hours. Stirring under carbon dioxide was continued throughout the heating period. On cooling to 5–10° C., a crop of 5-(delta-hydroxybutyl) hydantoin weighing 324 g. (45.2% of theoretical yield) and melting at 149–151° C. was obtained. By evaporating the mother liquor an additional 184 g. of less pure product was obtained. Total yield 71% of theoretical.

A mixture of 1 mole (172 g.) 5-(delta-hydroxybutyl) hydantoin and 25 cc. water was heated at approximately 115–120° C. while stirring and feeding hydrogen chloride gas for 6½ hours. The product was poured into hot water and cooled to crystallize; 159 g. (83.4% of the theoretical yield) of 5-(delta-chlorobutyl) hydantoin, melting at 123–124° C. was obtained.

5-(delta-aminobutyl) hydantoin prepared in a manner similar to that described in Example 1 was converted to lysine by the following procedure. 5-(delta-aminobutyl) hydantoin hydrochloride (39 g.; 0.19 mole) and 60% sulfuric acid (197 g.; 1.2 moles H2SO4) were placed in a 500 cc. flask fitted with a reflux condenser and thermometer. The mixture was heated under reflux at 127–128° C. for 5 hours, then at 135° C. for 5 hours after distilling off sufficient water to raise the boiling point to the latter temperature. The solution was diluted with water and neutralized with 300 g. of barium carbonate. The barium sulfate and excess barium carbonate were filtered off, the filtrate acidified with 100 cc. of conc. hydrochloric acid and evaporated to dryness under reduced pressure. The residue was dissolved in 190 cc. of hot 95% ethanol and treated with 19 g. (0.24 mole) of pyridine. Lysine monohydrochloride precipitated immediately. After filtering and drying, the product weighed 23 g. (67% of theoretical yield); its M. P. was 260–261° and its ionizable chlorine content was 18.8% (calc. for lysine monohydrochloride 19.4%).

*Example 3*

Six liters of water containing 13 cc. concentrated hydrochloric acid was heated to 60° C., and 25 moles (2100 g.) of dihydropyran added gradually with stirring under a reflux condenser. When the solution was clear it was neutralized with 17 g. (0.2 mole) of sodium bicarbonate and cooled in ice water. Hydrogen cyanide (25 moles, 1010 cc.) was added and the solution transferred to a 5 gallon stainless steel vessel previously charged with 3 kg. of ammonium carbonate. The mixture was heated for 3¾ hours, reaching a maximum temperature of 109° C. and pressure of 102 lbs. per square inch. On cooling, 1623 g. of 5-(delta-hydroxybutyl) hydantoin, M. P. 152–3° crystallized. By successive evaporation and crystallization, a second crop of 531 g. (M. P. 148–150.5°) and a third impure crop of 255 g. were obtained. Total yield was 56% of theoretical.

A similar experiment in which 2.5 kg. of ammonium carbonate was used with the same quantities of other materials and in which a maximum temperature of 130° C. was reached, gave 57.4% of the theoretical yield of pure 5-(delta-hydroxybutyl) hydantoin.

A mixture of 5-(delta-hydroxybutyl) hydantoin (2 moles; 344 g.) and 5-(delta-chlorobutyl) hydantoin (344 g.) was heated to fusion by means of an oil bath, and hydrogen chloride was fed with stirring at 130–140° C. for 6.8 hours. Samples were removed periodically for melting point determination to follow the course of the reaction. These gave the following results:

| Time (hours) | M. P. of mixture (°C.) |
| --- | --- |
| 1.3 | 100–105 |
| 2.0 | 115–118 |
| 2.6 | 118–121 |
| 3.5 | 121–123 |
| 5.5 | 125–127 |
| 6.4 | 125–127 |
| 6.8 | 125–127 |

As indicated by the above results, the reaction was complete in 5½ hours; the yield was substantially quantitative.

An 8 gal. stainless steel vessel was charged with 27.5 lbs. (0.175 lb. moles) of commercial ammonium carbonate (generally regarded as having a composition equivalent to

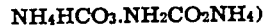

36 lbs. (0.59 lb. moles) of 28% aqueous ammonia, 3.4 lbs. (0.0178 lb. moles) of 5-(delta-chlorobutyl) hydantoin and 0.1 lb. potassium iodide. The mixture was heated with stirring at 50–53° C. until titration for ionizable chlorine showed the reaction to be complete (8 hours). The excess ammonia and ammonium carbonate were expelled by heating, and the solution concentrated to a volume of 2.3 gal. It was then placed in a 5 gal. stainless steel vessel, and 3.52 lbs. (0.088 lb. moles) of solid sodium hydroxide added gradually. The solution was heated with stirring at 122–127° for ten hours. The by-product ammonia was distilled off and the solution acidified with excess hydrochloric acid and evaporated to dryness under reduced pressure. The residue was extracted with hot methanol and the solution filtered to remove sodium chloride. A slight excess of pyridine was added to the filtrate to precipitate lysine monohydrochloride, which was filtered off and dried. The yield of lysine monohydrochloride was 65% of theoretical. Aliquot samples of the hydrolysis mixture removed after six and eight hours' reaction time gave 67% yields, indicating that substantially the same results would have been obtained had heating of the reaction mixture been discontinued at the end of 6 hours.

5-(delta-bromobutyl) hydantoin may be utilized in place of the corresponding chloro compound in the methods of the above examples to obtain substantially the same results. Use of the chloro compound, however, is preferred over the bromo compound for economic reasons.

*Example 4*

Dihydropyran (3 moles, 252 g.), water (600 cc.) and hydrochloric acid (15 cc. of 1 N) were stirred together until the dihydropyran was dissolved. The solution was cooled and the flask swept with carbon dioxide. A solution of 3 moles (153 g.) of sodium cyanide in 360 cc. water was added slowly with stirring under carbon dioxide. Ammonium hydroxide (3.3 moles, 220 cc.) was added rapidly and stirring under carbon dioxide continued at 50-60° C. for 5 hours and at 40-45° C. overnight. The mixture was cooled and acidified with 310 cc. concentrated hydrochloric acid. Two hundred and seventy grams of pure 5-(delta-hydroxybutyl) hydantoin crystallized directly. A second crop containing 26.2 g. of the hydantoin mixed with sodium chloride was obtained by evaporating the mother liquor. The total yield was 57.2% of theoretical.

Pyridine (50 g.) was saturated with hydrogen chloride gas and mixed with 0.5 mole (86 g.) of 5-(delta-hydroxybutyl) hydantoin. The mixture was heated in an oil bath and hydrogen chloride fed with stirring for 2 hours at approximately 125-130° C. The product was crystallized from 200 cc. water, to yield 90.3 g. (94.8% of theoretical) of 5-(delta-chlorobutyl) hydantoin, melting at 127-128° C.

*Example 5*

Dihydropyran (3 moles, 252 g.), water (600 cc.) and hydrochloric acid (15 cc. 1 N) was stirred together until the dihydropyran was dissolved. The mixture was cooled and a solution of 3 moles (153 g.) sodium cyanide in 360 cc. water added dropwise with stirring under carbon dioxide. Ammonium chloride (3 moles, 160.5 g.) was added and stirring under carbon dioxide continued at 45-60° C. for about 26 hours. On cooling, 232 g. of pure 5-(delta-hydroxybutyl) hydantoin crystallized. An additional crop of 52.5 g. with correct melting point but contaminated with a trace of sodium chloride was obtained by evaporating the mother liquor. The total yield was 55% of theoretical.

5-(delta-hydroxybutyl) hydantoin (0.5 mole, 86 g.) and water (40 cc.) were heated to fusion in a water bath and gaseous hydrogen bromide passed in with stirring until it was no longer absorbed at an appreciable rate (2.4 hours). The product was poured into hot water and cooled to crystallize. The dried crystals weighed 104 g. (88.8% of theory) and melted at 128-129.5° C.; the melting point was unchanged by recrystallization from methanol.

*Example 6*

Distilled water (600 cc.) was acidified with 15 cc. 1 N hydrochloric acid and heated to 70° C. Dihydropyran (1 mole, 84 g.) was added and the mixture stirred until the dihydropyran dissolved (45 min.). The solution was neutralized with 1.5 g. sodium bicarbonate and cooled to room temperature. Crude commercial calcium cyanide (24% CN, 84 g.) was added, and the flask swept with carbon dioxide. The mixture was held at approximately 60° C. while stirring under carbon dioxide for 2 hours, then digested overnight at approximately 40° C. under carbon dioxide without stirring. The mixture was again heated to 65° C. and filtered to remove calcium carbonate along with insoluble impurities originally present in the calcium cyanide. The filtrate was evaporated to 200 cc. and cooled to crystallize the product. The latter, when washed and dried, melted at 151-152° C. and weighed 27 g. The mother liquor was acidified with 30 cc. concentrated hydrochloric acid and heated on the steam bath overnight. On cooling, an additional 8.9 g. of hydroxybutyl hydantoin, M. P. 146-147°, precipitated. Total yield 35.9 g. (21% of theoretical).

*Example 7*

A solution of 12 cc. 1 N hydrochloric acid in 600 cc. water was heated to 50° C., and 3 moles (252 g.) dihydropyran added. The mixture was stirred until the dihydropyran had dissolved (23 min.), then neutralized with 1.5 g. sodium bicarbonate and cooled to 15° C. Liquid hydrogen cyanide (3 moles, 120 cc.) was added, the air displaced from the reaction flask with carbon dioxide, and 4 moles (270 cc.) concentrated ammonium hydroxide added gradually with stirring (¾ hour). The mixture was heated at 50° C. with stirring under an atmosphere of carbon dioxide until successive titrations for ammonium hydroxide gave constant results (9 hours). The temperature of the mixture was raised sufficiently to dissolve the hydantoin which had precipitated at this point, and the solution divided into two equal parts, which were treated as follows:

a. One portion of the solution was cooled to 15° C., and filtered, the crop of delta-(hydroxybutyl) hydantoin thus obtained weighed 107 g. and melted at 151-151.5° C. An additional 55.8 g., M. P. 140-143° C., was obtained by evaporating the mother liquor and crystallizing from methanol. No additional crystalline product could be recovered from the final mother liquor. The total yield from this portion of the reaction mixture was 162.8 g. (63.2% of the theoretical).

b. The second portion was boiled to expel excess ammonia, acidified with 10 cc. concentrated hydrochloric acid and heated on the steam bath for one hour, at which time it was found to be only faintly acidic. An additional 10 cc. concentrated hydrochloric acid was added, and heating continued for 2 hours (total heating time 3 hours). The solution was cooled and filtered, yielding 180 g. 5-(delta-hydroxybutyl) hydantoin, M. P. 146-148° C. Additional crops of 8 g. (M. P. 140-143°) and 3 g. (M. P. 146-148°) were obtained by successive evaporation and crystallization. The total yield from this portion of the reaction mixture was 191 g. (74% of theoretical).

When lysine is required in a purified form, it is preferably isolated as the mono- or dihydrochloride, since these compounds may be obtained readily as crystalline products. However, for purposes of nutrition it is immaterial whether lysine be used in the form of an acid salt, e. g. a hydrohalide, as a basic salt, e. g. the sodium salt, or as the free amino-acid. It is necessary only that the lysine be in an available form and free of materials which are toxic in the quantity required. The method herein described provides lysine initially in aqueous solution which may be acid, neutral or basic and which may be used directly or may be subjected to further treatment to obtain a crystalline derivative of lysine, utilized in our invention e. g. a hydrohalide.

The term "dihydropyran" as used in the specification and the claims is intended to designate the compound 2,3-dihydro-1,4-pyran having the following formula:

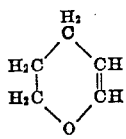

This is the dihydropyran commonly referred to as 2,3-dihydropyran.

Throughout the specification and in the appended claims the term "lysine" is used to refer to the racemic mixture of optical isomers and to lysine in the form of its monohydrohalide, dihydrohalide or other salts.

"Hydrating" is used in this specification and claims to mean, combining with water, in accordance with the definitions of "hydrated" and "hydration" appearing in Hackh's Chemical Dictionary, third edition.

I claim:

1. The process for the production of lysine which comprises reacting in aqueous solution at elevated temperatures delta-hydroxyvaleraldehyde, a compound yielding ammonium ions, a compound yielding carbonate ions and a compound yielding cyanide ions to form 5-(delta-hydroxybutyl) hydantoin; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with ammonia and hydrolyzing the resultant 5-(delta-aminobutyl) hydantoin.

2. Process for the production of lysine which comprises reacting in aqueous basic solution at elevated temperatures delta-hydroxyvaleraldehyde, a compound yielding ammonium ions, a compound yielding carbonate ions and a compound yielding cyanide ions to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with ammonia and hydrolyzing the resultant 5-'elta-aminobutyl) hydantoin.

3. Process for the production of lysine which comprises hydrating dihydropyran in dilute aqueous acid medium and reacting the resulting product mixture in aqueous solution with a compound yielding ammonium ions, a compound yielding carbonate ions and a compound yielding cyanide ions at elevated temperatures to produce 5-(delta-hydroxybutyl) hydantoin; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with ammonia and hydrolyzing the resultant 5-(delta-aminobutyl) hydantoin.

4. Process for the production of lysine which comprises hydrating dihydropyran in dilute aqueous acid medium, and reacting the resulting product mixture in aqueous solution with a compound yielding ammonium ions, a compound yielding carbonate ions and a compound yielding cyanide ions at elevated temperatures, acidifying and heating the resulting reaction mixture and isolating 5-(delta-hydroxybutyl) hydantoin therefrom; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with ammonia and hydrolyzing the resultant 5-(delta-aminobutyl) hydantoin.

5. Process for the production of lysine which comprises reacting in aqueous solution at elevated temperatures delta-hydroxyvaleraldehyde, hydrogen cyanide, ammonia and carbon dioxide to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with ammonia in the presence of at least 10 moles of ammonia per mole of hydantoin and hydrolyzing the resultant 5-(delta-aminobutyl) hydantoin.

6. Process for the production of lysine which comprises reacting in aqueous solution at temperatures of 60° to 120° C. delta-hydroxyvaleraldehyde, hydrogen cyanide, ammonia and carbon dioxide to form 5-(delta-hydroxybutyl) hydantoin; reacting said 5-(delta-hydroxybutyl) hydantoin with hydrogen chloride at 115° to 135° C. to produce 5-(delta-chlorobutyl) hydantoin; reacting said 5-(delta-chlorobutyl) hydantoin with ammonia in the presence of at least 10 moles of ammonia per mole of hydantoin and hydrolyzing the resultant 5-(delta-aminobutyl) hydantoin.

7. Process for the production of lysine which comprises hydrating dihydropyran in dilute aqueous acid medium and reacting the resulting product mixture in aqueous basic solution with a compound yielding ammonium ions, a compound yielding carbonate ions and a compound yielding cyanide ions at elevated temperatures to form 5-(delta-hydroxybutyl) hydantoin; reacting said 5-(delta-hydroxybutyl) hydantoin with a material from the group consisting of hydrogen chloride and hydrogen bromide at elevated temperatures to produce a compound from the group consisting of 5-(delta-chlorobutyl) hydantoin and 5-delta-bromobutyl) hydantoin; reacting a compound from the group consisting of 5-(delta-chlorobutyl) hydantoin and 5-(delta-bromobutyl) hydantoin with ammonia and hydrolyzing the resultant 5-(delta-aminobutyl) hydantoin.

8. Process for the production of lysine which comprises hydrating dihydropyran in dilute aqueous acid medium, and reacting the resulting product mixture in aqueous basic solution with a compound yielding ammonium ions, a compound yielding carbonate ions and a compound yielding cyanide ions at about 60 to 120° C., acidifying and heating the resulting reaction mixture with hydrochloric acid and isolating 5-(delta-hydroxybutyl) hydantoin therefrom, reacting said 5-(delta-hydroxybutyl) hydantoin with a compound from the group consisting of hydrogen chloride and hydrogen bromide at 115° to 135° C. to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with ammonia at 0° to 150° C. and hydrolyzing the resultant 5-(delta-aminobutyl) hydantoin.

9. Process for the production of lysine which comprises hydrating dihydropyran in dilute aqueous acid medium and reacting the resulting product mixture in aqueous basic solution with a compound yielding ammonium ions, a compound yielding carbonate ions and a compound yielding cyanide ions at elevated temperatures to form 5-(delta-hydroxybutyl) hydantoin; contacting a mixture of said 5-(delta-hydroxybutyl) hydantoin and a material from the group consisting of 5-(delta-chlorobutyl) hydantoin and 5-(delta-bromobutyl) hydantoin with a material from the group consisting of hydrogen chloride and hydrogen bromide at elevated temperatures to produce a compound from the group consisting of 5-(delta-chlorobutyl) hydantoin and 5-(delta-bromobutyl) hydantoin; reacting a compound from the group consisting of 5-(delta-chlorobutyl) hydantoin and 5-(delta-bromobutyl) hydantoin with ammonia in an equeous medium in the presence of an ammonium salt containing in combined form from 20 to 80% of the total inorganic ammonia present and hydrolyzing the resultant 5-(delta-aminobutyl) hydantoin.

10. Process for the production of lysine which comprises reacting in aqueous solution at elevated temperatures delta-hydroxyvaleraldehyde, sodium cyanide and ammonium carbonate to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with ammonia and hydrolyzing the resultant 5-(delta-aminobutyl) hydantoin.

11. Process for the production of lysine which comprises reacting in aqueous solution at elevated temperatures delta-hydroxyvaleraldehyde, sodium cyanide and ammonium chloride to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with ammonia and hydrolyzing the resultant 5-(delta-aminobutyl) hydantoin.

12. Process for the production of lysine which comprises reacting in aqueous solution at elevated temperatures delta-hydroxyvaleraldehyde, hydrogen cyanide, ammonia and carbon dioxide to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with ammonia in the presence of at least 10 moles of ammonia per mole of hydantoin and hydrolyzing the resultant 5-(delta-aminobutyl) hydantoin with an aqueous solution of a strong mineral acid at a temperature of 120° to 200° C.

13. Process for the production of lysine which comprises reacting in aqueous solution at elevated temperatures delta-hydroxyvaleraldehyde, hydrogen cyanide, ammonia and carbon dioxide to form 5-(delta-hydroxybutyl) hydantoin; reacting said 5-(delta-hydroxybutyl) hydantoin with hydrogen chloride at elevated temperatures to produce 5-(delta-chlorobutyl) hydantoin; reacting said 5-(delta-chlorobutyl) hydantoin with ammonia in the presence of at least 10 moles of ammonia per mole of hydantoin and hydrolyzing the resultant 5-(delta-aminobutyl) hydantoin with an aqeous solution of a strong inorganic base at a temperature of 110° to 150° C.

14. A method for the production of lysine comprising reacting a compound from the group consisting of 5-(delta-chlorobutyl) hydantoin and 5-(delta-bromobutyl) hydantoin with ammonia and hydrolyzing the resultant aminobutyl hydantoin product.

15. A method for the production of lysine comprising reacting a compound from the group consisting of 5-(delta-chlorobutyl) hydantoin and 5-(delta-bromobutyl) hydantoin with at least 10 moles of ammonia per mole of said hydantoin and hydrolyzing the resultant 5-(delta-aminobutyl) hydantoin.

16. A method in accordance with claim 15 wherein from 10 to 100 moles of ammonia are employed per mole of the halobutyl hydantoin and the reaction between said materials is carried out at a temperature of 0 to 150° C.

17. A method in accordance with claim 16 wherein the reaction between ammonia and the halobutyl hydantoin is carried out at a temperature of 30 to 100° C.

18. A method comprising reacting a compound from the group consisting of 5-(delta-chlorobutyl) hydantoin and 5-(delta-bromobutyl) hydantoin with ammonia at a temperature of 30 to 100° C. employing from 10 to 100 moles of ammonia per mole of the halobutyl hydantoin, hydrolyzing the resultant 5-(delta-aminobutyl) hydantoin at a temperature of 80 to 300° C. and isolating a lysine hydrohalide.

19. A method in accordance with claim 18 wherein the reaction between ammonia and the halobutyl hydantoin is carried out in an aqueous medium in the presence of an ammonium salt containing in combined form from 20–80% of the total inorganic ammonia present.

20. A method in accordance with claim 19 wherein the reaction medium contains a compound of the group consisting of ammonium carbonate, ammonium bicarbonate, and ammonium carbamate, the total of such compound present being stoichiometrically equivalent to from 10 to 55 moles of carbon dioxide per mole of halobutyl hydantoin.

21. A method in accordance with claim 18 wherein hydrolysis of the aminobutyl hydantoin is effected using an aqueous solution of a strong mineral acid at a temperature of 120 to 200° C.

22. A method in accordance with claim 18 wherein hydrolysis of the aminobutyl hydantoin is effected using an aqueous solution of a strong inorganic base at a temperature of 110 to 150° C.

23. A method comprising reacting aqueous ammonia with a compound from the group consisting of 5-(delta-chlorobutyl) hydantoin and 5-(delta-bromobutyl) hydantoin at 30 to 100° C. in the presence of ammonium salts of the group consisting of ammonium carbonate, ammonium bicarbonate and ammonium carbamate, the total of such salts present being equivalent stoichiometrically to from 10-55 moles of carbon dioxide per mole of the halobutyl hydantoin, heating the resulting mixture to expel ammonium carbonate and excess ammonia and to concentrate the resulting aqueous solution of 5-(delta-aminobutyl) hydantoin, heating said concentrated solution with a 50-100% excess of hydrochloric acid at 120 to 200° C. and recovering from the resulting mixture a hydrochloride of lysine.

24. A method comprising reacting aqueous ammonia with a compound from the group consisting of 5-(delta-chlorobutyl) hydantoin and 5-(delta-bromobutyl) hydantoin at 30 to 100° C. in the presence of ammonium salts of the group consisting of ammonium carbonate, ammonium bicarbonate and ammonium carbamate, the total of such salts present being equivalent stoichiometrically to from 10-55 moles of carbon dioxide per mole of the halobutyl hydantoin, heating the resulting mixture to expel ammonium carbonate and excess ammonia and to concentrate the resulting aqueous solution of 5-(delta-aminobutyl) hydantoin, heating said concentrated solution with a 15 to 25% excess of an aqueous solution of an alkali metal hydroxide at 110 to 150° C. and recovering lysine as a hydrochloride thereof.

25. A method in accordance with claim 23 wherein the halobutyl hydantoin employed is 5-(delta-chlorobutyl) hydantoin.

26. A method in accordance with claim 24 wherein the halobutyl hydantoin employed is 5-(delta-chlorobutyl) hydantoin.

ARTHUR O. ROGERS.

REFERENCES CITED

The following references are of record in the file of this patent:

Hoppe-Seyler, Z. Physiol. Chem., vol. 214, p. 267 (1932).

Livak et al., J. Am. Chem. Soc., vol. 67, pp. 2218-2220 (1945).

Block, Chem. Reviews, vol. 38, pp. 527-531 (1946).

Gaudry, Can. J. Research, vol. 26B, pp. 387-392 (1948).